(12) United States Patent
Lee

(10) Patent No.: US 8,269,937 B2
(45) Date of Patent: Sep. 18, 2012

(54) SUBSTRATE FOR LIQUID CRYSTAL DISPLAY DEVICE INCLUDING PERIPHERAL LINES HAVING OPENINGS AND FABRICATING METHOD THEREOF

(75) Inventor: Deok-Won Lee, Gyeonggido (KR)

(73) Assignee: LG Display Co., Ltd., Seoul (KR)

( * ) Notice: Subject to any disclaimer, the term of this patent is extended or adjusted under 35 U.S.C. 154(b) by 373 days.

(21) Appl. No.: 11/144,269

(22) Filed: Jun. 3, 2005

(65) Prior Publication Data
US 2005/0270467 A1 Dec. 8, 2005

(30) Foreign Application Priority Data

Jun. 3, 2004 (KR) .................. 10-2004-0040301

(51) Int. Cl.
*G02F 1/1333* (2006.01)
*G02F 1/1343* (2006.01)
*G02F 1/1345* (2006.01)
(52) U.S. Cl. ........ 349/140; 349/138; 349/139; 349/149; 349/152
(58) Field of Classification Search .......... 349/150–152, 349/138–140, 149
See application file for complete search history.

(56) References Cited

U.S. PATENT DOCUMENTS

| 6,198,051 | B1* | 3/2001 | Moshrefzadeh et al. | 174/255 |
| 6,744,484 | B1* | 6/2004 | Yoshino et al. | 349/153 |
| 2001/0040649 | A1* | 11/2001 | Ozaki | 349/43 |
| 2001/0046016 | A1* | 11/2001 | Park et al. | 349/139 |
| 2002/0067456 | A1* | 6/2002 | Tatsumi | 349/149 |
| 2003/0128306 | A1* | 7/2003 | Kai | 349/39 |
| 2003/0197187 | A1* | 10/2003 | Kim et al. | 257/83 |
| 2004/0070698 | A1* | 4/2004 | Choi et al. | 349/43 |

FOREIGN PATENT DOCUMENTS

| KR | 2003-60052 | 7/2003 |
| KR | 2004-41491 | 5/2004 |

OTHER PUBLICATIONS

Office Action issued in corresponding Korean Patent Application No. 10-2004-0040301, mailed Oct. 26, 2010.

* cited by examiner

*Primary Examiner* — Lauren Nguyen
(74) *Attorney, Agent, or Firm* — Brinks Hofer Gilson & Lione

(57) ABSTRACT

A liquid crystal display device includes a substrate having a display region and a non-display region. In the display region, the gate line and a data line cross to define a pixel region and a thin film transistor is disposed at the crossing portion of the gate and data lines. The thin film transistor includes a gate electrode and source and drain electrodes. A peripheral line having a plurality of openings is disposed in the non-display region. The openings are slits, rectangles, circles, or triangles. The openings relieve plasma during dry-etching of the peripheral line. A pixel electrode is connected to the drain electrode in the pixel region.

19 Claims, 22 Drawing Sheets

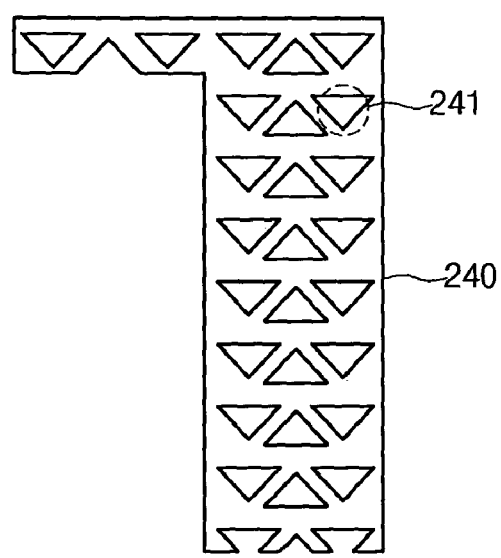

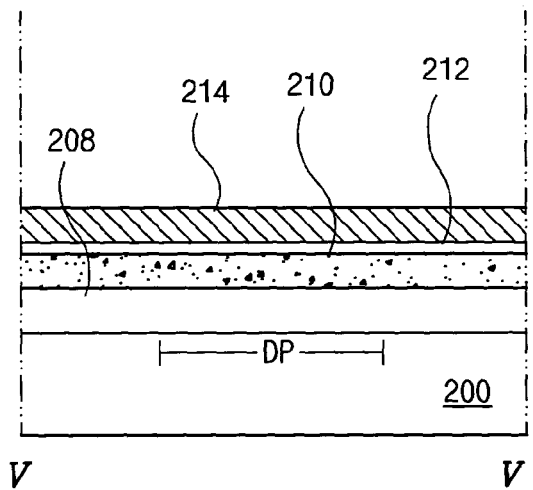
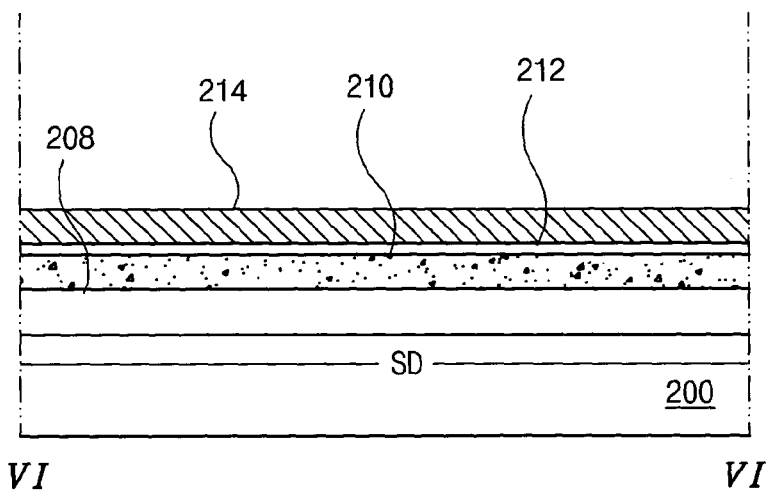

SUBSTRATE FOR LIQUID CRYSTAL DISPLAY DEVICE INCLUDING PERIPHERAL LINES HAVING OPENINGS AND FABRICATING METHOD THEREOF

The present invention claims the benefit of Korean Patent Application No. 2004-0040301, filed in Korea on Jun. 3, 2004, which is hereby incorporated by reference.

FIELD OF THE INVENTION

The present invention relates to a liquid crystal display device, and more particularly, to a substrate for a liquid crystal display (LCD) device and a fabricating method thereof.

DISCUSSION OF THE RELATED ART

Until recently, display devices have typically used cathode-ray tubes (CRTs). Presently, much effort is being expended to study and develop various types of flat panel displays, such as liquid crystal display (LCD) devices, plasma display panels (PDPs), field emission displays, and electro-luminescence displays (ELDs), as a substitute for CRTs. Of these flat panel displays, the LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into direction of the induced electric field, thereby changing the light transmissivity of the LCD device. Thus, the LCD device displays images by varying the intensity of the induced electric field.

FIG. 1 is a perspective view of a LCD device according to the related art. FIG. 2 is a schematic view of structures of a peripheral line on a substrate for an LCD device according to the related art.

As shown in FIG. 1, the LCD device 9 includes a first substrate 10, a second substrate 20 and a liquid crystal material 18. The second substrate 20 is referred to as a color filter substrate that includes a color filter pattern 24, a black matrix 22 between the color filter patterns 24, and a common electrode 28 on both the color filter pattern 24 and the black matrix 22. The first substrate 10 is referred to as an array substrate that includes a data line 14 and a gate line 12 that cross each other and define a pixel region P. A pixel electrode 16 and a thin film transistor T as a switching element are positioned in each pixel region P. Thin film transistors T, which are disposed adjacent to where the data lines 14 and the gate lines 12 cross, are disposed in a matrix form on the first substrate 10. A data pad electrode 15 is disposed on one end of the data line 14. Thought not shown in FIG. 1, a gate pad electrode is disposed on one end of the gate line 12.

To fabricate the related art LCD device, multiple mask processes are conducted, for example, a five-mask method or a four-mask method.

A five-mask method includes a first mask process for forming the gate line 12 and a gate electrode of the thin film transistor T, a second mask process for forming a semiconductor pattern of the thin film transistor T, a third mask process for forming the data line 14 and source and drain electrodes of the thin film transistor T, a fourth mask process for forming a passivation layer, and a fifth mask process for forming a pixel electrode 16. The first to fifth mask processes are conducted with a wet-etching method or a dry-etching method.

When the five-mask method is used, a peripheral line 80, as shown in FIG. 2, including a common line, a ground line and so on is formed during the first to third processes. The peripheral line 80 is formed in a non-display region ND defined at peripheral portions of a display region D having the pixel regions P. The peripheral line 80 has larger area than the data line 14 such that a resistance thereof is reduced. In the five-mask method, since each layer is patterned with each corresponding mask process, the patterned layer is not affected by different mask processes. However, to decrease production process time and cost, the number of mask processes used is reduced.

The four-mask method includes four mask processes. The four-mask method includes a first mask process for forming the gate line 12 and a gate electrode, a second mask process for forming the data line 14, source and drain electrodes and a semiconductor pattern therebelow, a third mask process for forming a passivation layer, and a fourth mask process for forming the pixel electrode 16. The first to fourth mask processes are conducted with a wet-etching method or a dry-etching method.

When the four-mask method is used, the peripheral line 80 is formed during the first and second processes. The second mask process is conducted to pattern not only the data line 14 and the source and drain electrodes, but also the semiconductor pattern therebelow. In other words, the data line 14 and the source and drain electrodes, and the semiconductor pattern therebelow are patterned with the same mask process. Accordingly, etching times for the second mask process increase. Further, when the dry-etching method for the second mask process is used, the amount of etching gases used increase. Therefore, the peripheral line 80 at the same layer as the data line 14 is over-etched during the second mask process, and thus portions of the peripheral line 80 may be etched away. Further, since the peripheral line 80 has a large area to reduce the resistance thereof, plasma generated for the dry-etching method is concentrated on the peripheral line 80. Therefore, the peripheral line 80 is further over-etched, and thus portions of the peripheral line 80 may be etched away. As a result, the resistance of the peripheral line 80 is changed, and thus display quality of the LCD device is degraded.

SUMMARY OF THE INVENTION

A substrate for a liquid crystal display device is provided that can reduce over-etching of a peripheral line and improve display quality. In addition, a method of fabricating a substrate for a liquid crystal display device is provided that can reduce over-etching of a peripheral line and improve display quality.

By way of introduction only, a display device includes a substrate having a display region and a non-display region; a gate line and a data line to define a pixel region in the display region; a thin film transistor at the crossing portion of the gate and data lines, the thin film transistor including a gate electrode and source and drain electrodes; a peripheral line having a plurality of openings in the non-display region; and a pixel electrode connected to the drain electrode in the pixel region.

In another aspect, a method of fabricating a display device includes forming a gate line and a gate electrode on a substrate, the substrate having a display region and a non-display region; forming first and second semiconductor layers, a data line, source and drain electrodes and a peripheral line, wherein the data line crosses the gate line to define a pixel region in the display region, and the peripheral line has a plurality of openings in the non-display region; and forming a pixel electrode connected to the drain electrode in the pixel region.

In another aspect, a method of fabricating a display device includes: forming a metal layer in a non-display region of a substrate; forming a photoresist on the metal layer; patterning the photoresist to form a photoresist pattern on the metal layer; and etching the metal layer using the photoresist pattern to form a peripheral line having a plurality of openings. The display device may be fabricated using no more than four mask processes.

Accordingly, the openings may be of sufficient size and number to relieve concentration of plasma during dry-etching of the peripheral line such that no portions of the peripheral line are etched away during the dry-etching of the peripheral line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A to 5C are schematic views of openings for a peripheral line having rectangular, circular and triangular shapes, respectively, according to the present invention;

FIGS. 6C, 7C, 8C, 9C, 10C, 11C, 12C and 13C are cross sectional views taken along a line V-V of FIG. 3 of a fabricating method according of a substrate for an LCD device to the present invention; and FIGS. 6D, 7D, 8D, 9D, 10D, 11D, 12D and 13D are cross sectional views taken along a line VI-VI of FIG. 3 of a fabricating method of a substrate for an LCD device according to the present invention.

DETAILED DESCRIPTION OF THE PREFERRED EMBODIMENTS

Reference will now be made in detail to the illustrated embodiments of the present invention, which are illustrated in the accompanying drawings.

Figure 1:
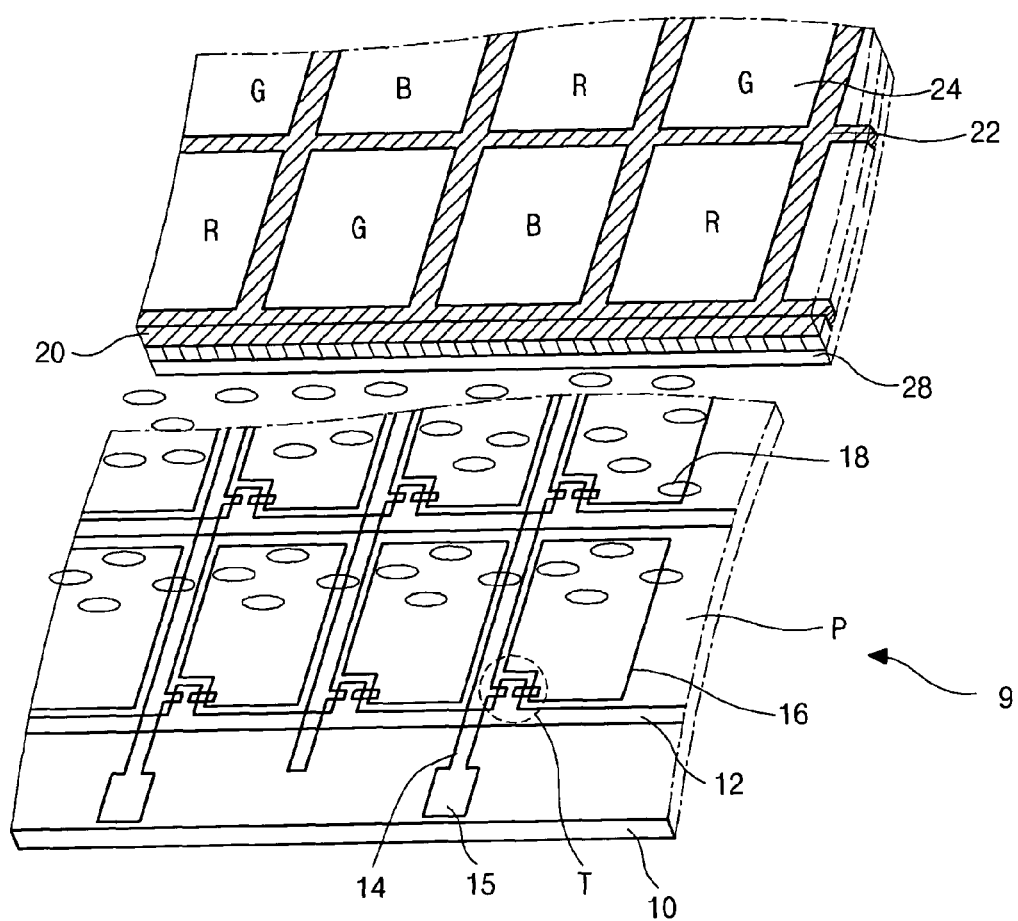
FIG. 1 is a perspective view of a LCD device according to the related art.
Figure 2:
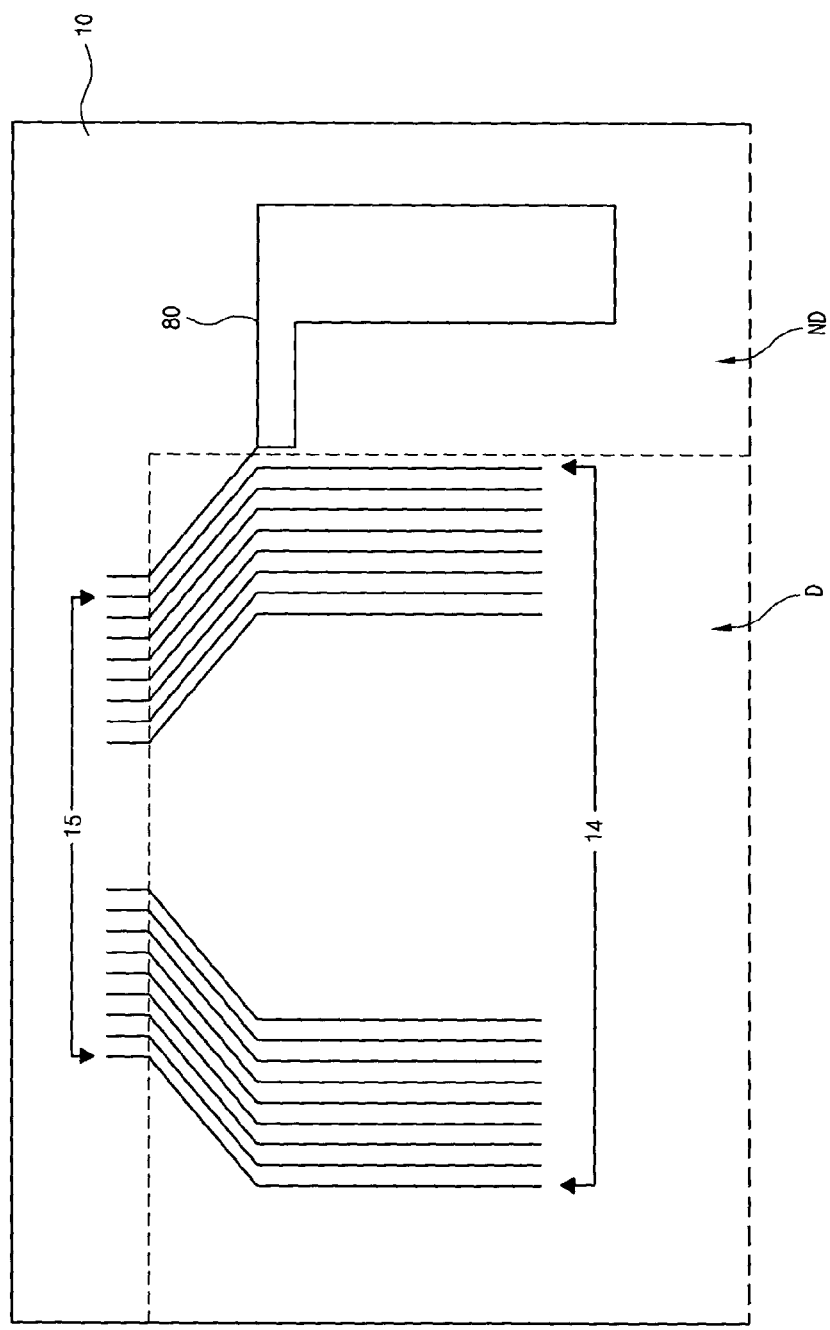
FIG. 2 is a schematic view of structures of a peripheral line on a substrate for an LCD device according to the related art.
Figure 3:
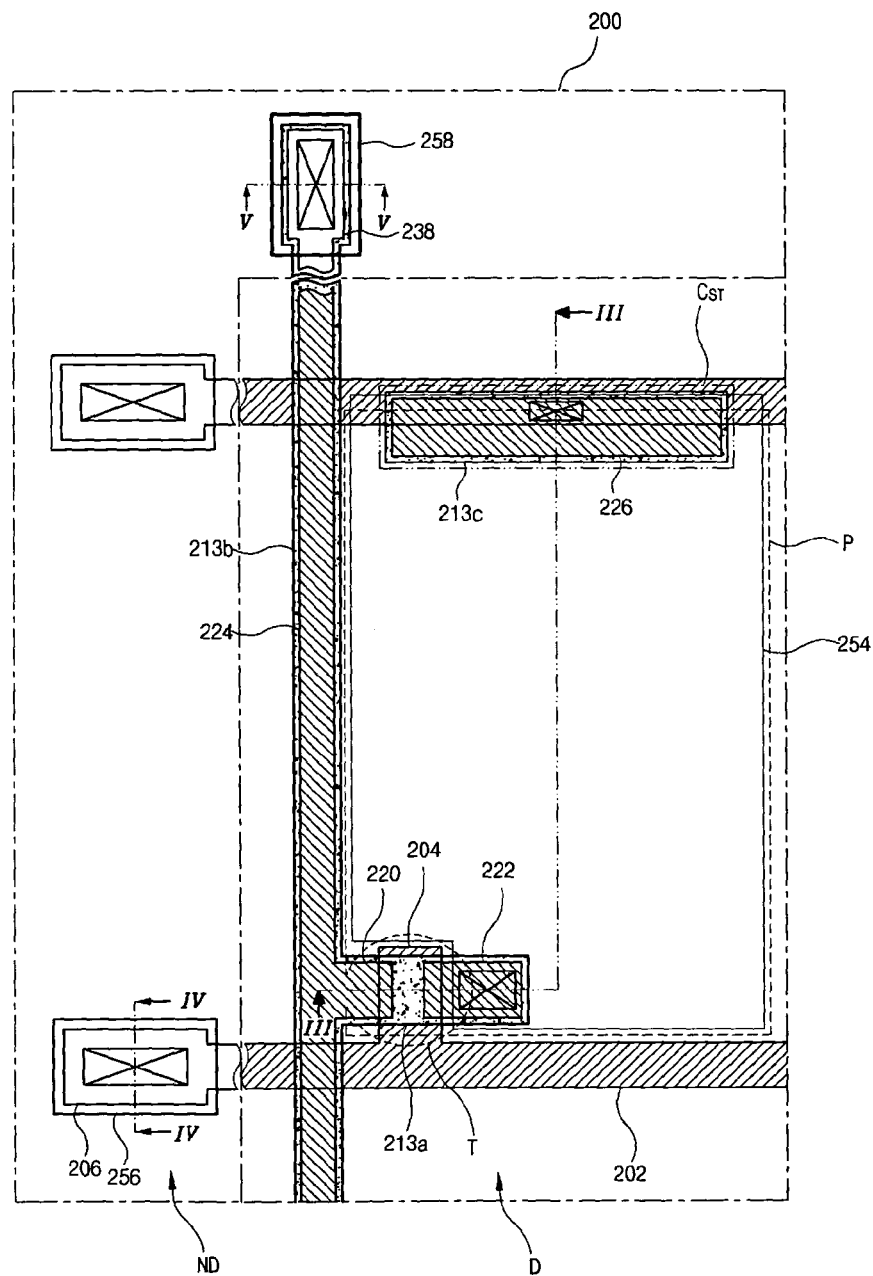
FIG. 3 is a plan view of a substrate for an LCD device according to the present invention.
Figure 4:
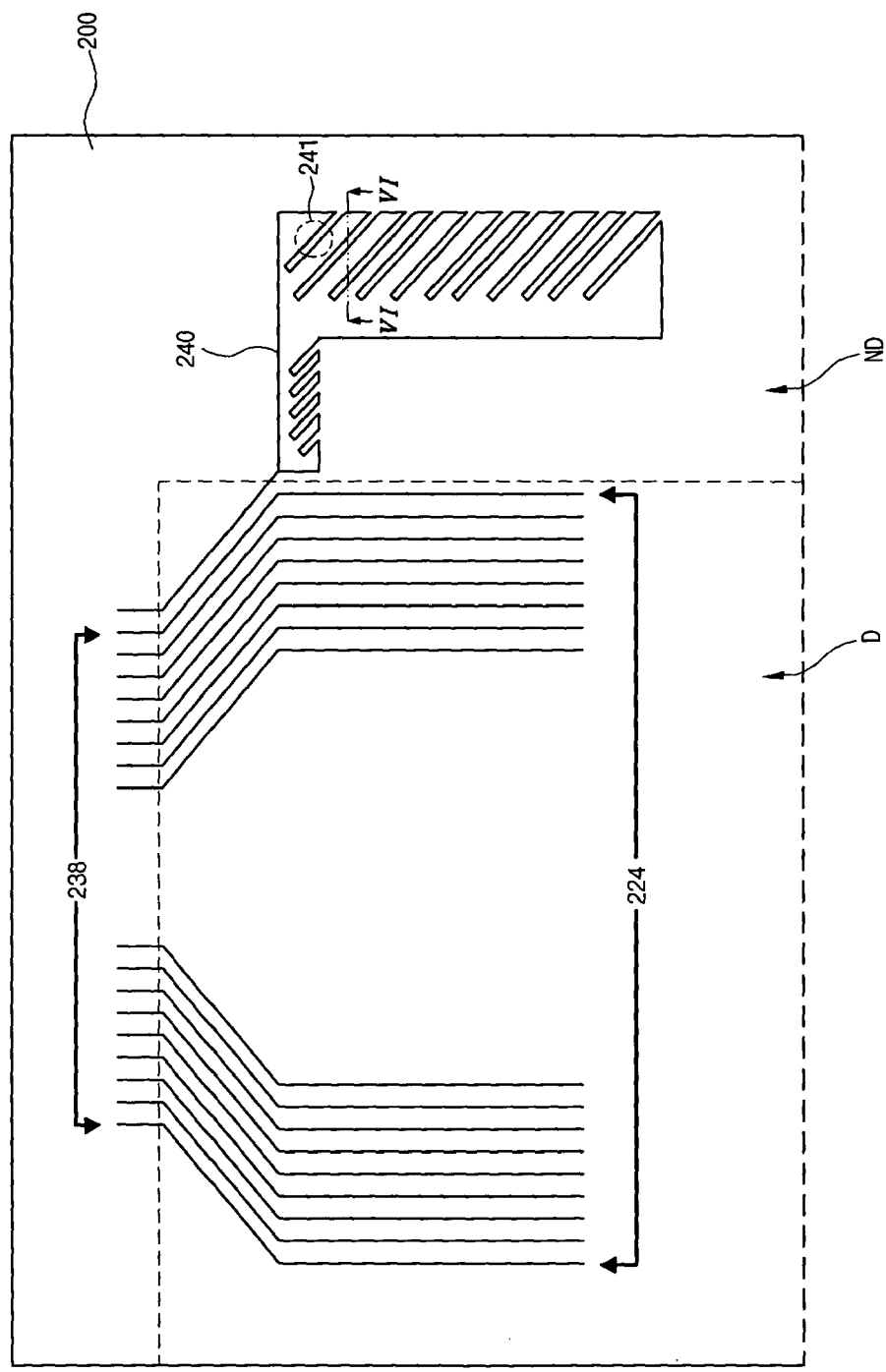
FIG. 4 is a schematic view of structures of a peripheral line on a substrate for an LCD device according to the present invention. The substrate for the LCD device is fabricated with a four-mask method.

FIG. 3 is a plan view of a substrate for an LCD device according to the present invention. FIG. 4 is a schematic view of structures of a peripheral line on a substrate for an LCD device according to the present invention. The substrate for the LCD device is fabricated with a four-mask method.

As shown in FIG. 3, a gate line 202 and a data line 224 are disposed on a substrate 200 having a display region D and a non-display region ND at periphery portions of the display region D. The gate and data lines 202 and 224 cross each other to define a pixel region P in the display region D. A gate pad electrode 206 is disposed on one end of the gate line 202, and a data pad electrode 238 is disposed on one end of the data line 224. The gate pad and data pad electrodes 206 and 238 is disposed in the non-display region ND. A gate pad electrode terminal 256 and a data pad electrode terminal 258 are disposed on the gate and data pad electrodes 206 and 238.

A thin film transistor T is disposed at the crossing portion of the gate and data lines 202 and 224. The thin film transistor T includes a gate electrode 204, a first semiconductor pattern 213a, and source and drain electrodes 220 and 222. A second semiconductor pattern 213b is disposed below the data line 224 and extended along the data line 224.

A pixel electrode 254 is disposed in the pixel region P and connected to the drain electrode 222. A storage electrode 226 is disposed on the gate line 202 to define a storage capacitor $C_{ST}$ with the gate line 202 overlapping the storage electrode 226. The storage electrode 226 is connected to the pixel electrode 254. A third semiconductor pattern 213c is disposed below the storage electrode 226.

Since the substrate for the LCD device of the present invention is fabricated with a four-mask method, the second and third semiconductor patterns 213b and 213c are formed below the data line 224 and the storage electrode 226. Further, the semiconductor patterns 213a to 213c have widths greater than the source and drain electrodes 220 and 222, the data line 224 and the storage electrode 226.

In the non-display region ND, a peripheral line 240 including a common line and a ground line is disposed as shown in FIG. 4. The peripheral line 240 has larger area than the data line 224 such that a resistance thereof is reduced. According to the four-mask method, the fourth semiconductor pattern is disposed below the peripheral line 224 similarly to the first to third semiconductor patterns 213a to 213c. The peripheral line 240 has a slit-shaped opening 241 to relieve plasma for a dry-etching method being concentrated on the peripheral line 240. In other words, since the peripheral line 240 has slit-shaped openings 241 which are arranged in parallel to each other at the side portions, the peripheral line 240 has an area smaller than that of the related art. Accordingly, concentration of plasma for the dry-etching method may be relieved. It should be understood that the slit-shaped opening 241 is disposed inside the peripheral line 240 to reduce the area thereof. To reduce the area of the peripheral line 240, other shaped openings may be used.

Figure 5A:
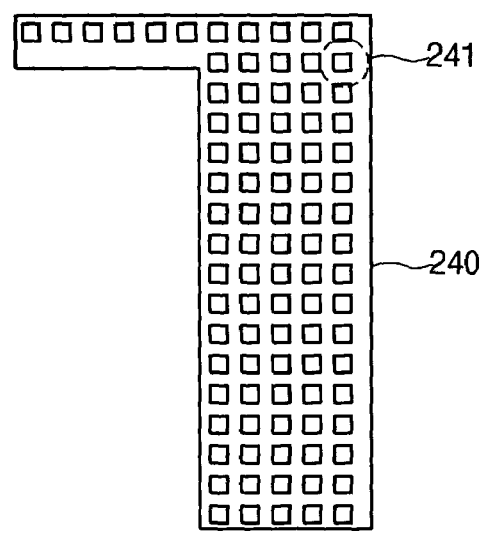
Figure 5B:
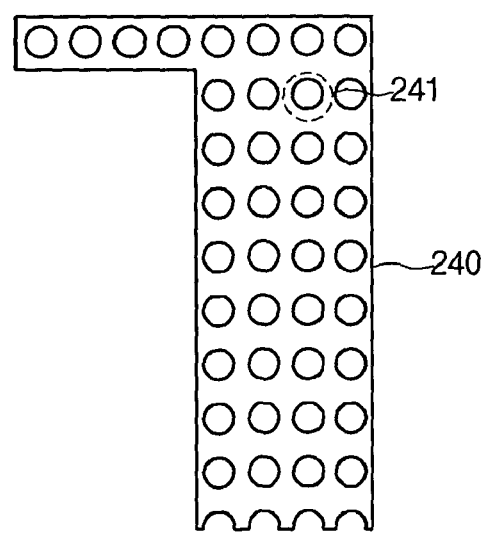
Figure 6A:
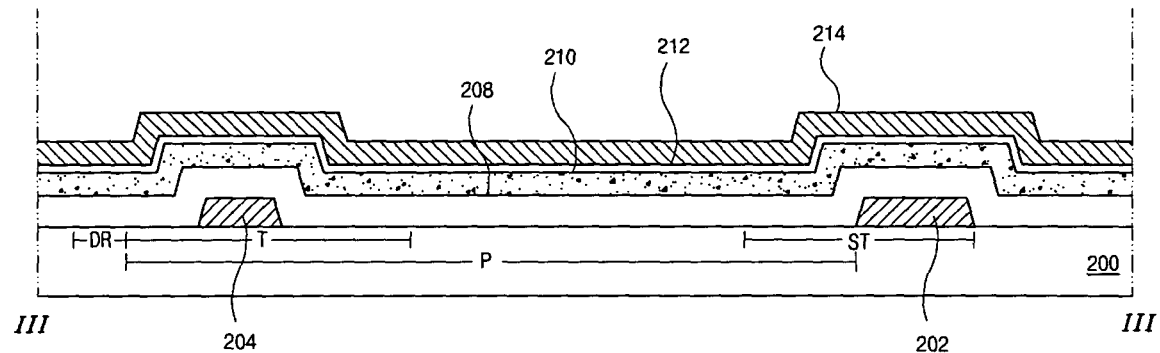
FIGS. 6A, 7A, 8A, 9A, 10A, 11A, 12A and 13A are cross sectional views taken along a line III-III of FIG. 3 of a fabricating method of a substrate for an LCD device according to the present invention.
Figure 6B:
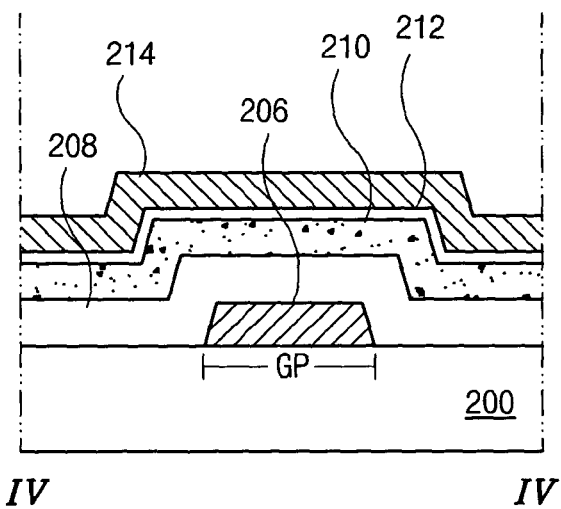
FIGS. 6B, 7B, 8B, 9B, 10B, 11B, 12B and 13B are cross sectional views taken along a line IV-IV of FIG. 3 of a fabricating method of a substrate for an LCD device according to the present invention.
Figure 7A:
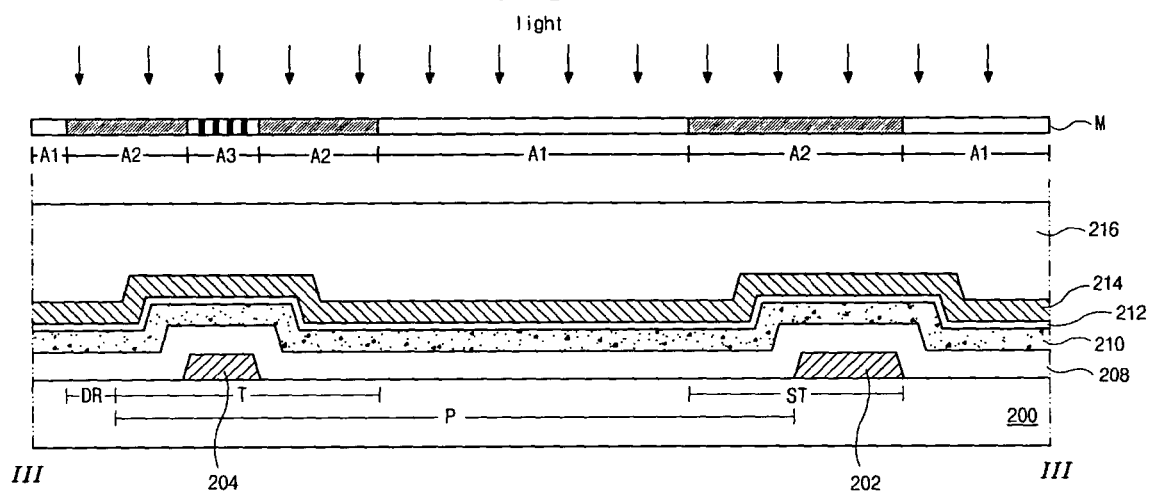
Figure 7B:
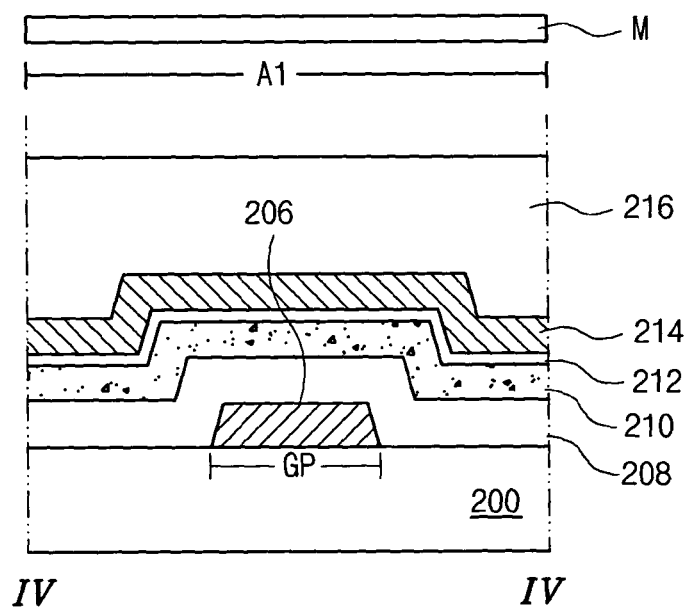
Figure 7C:
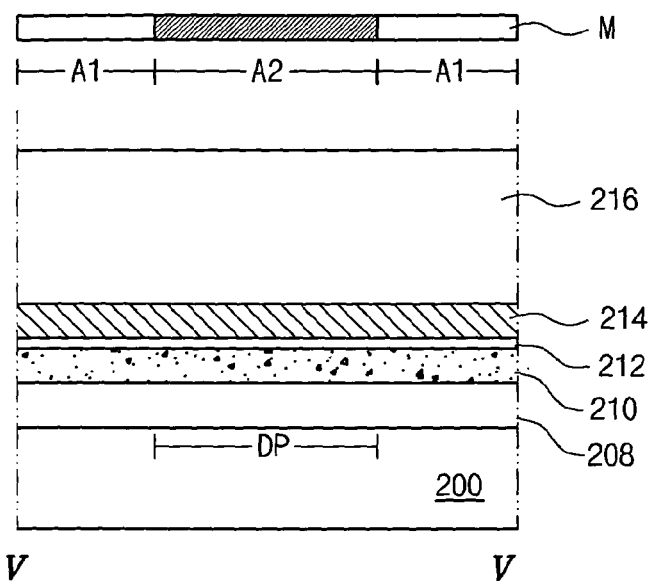
Figure 7D:
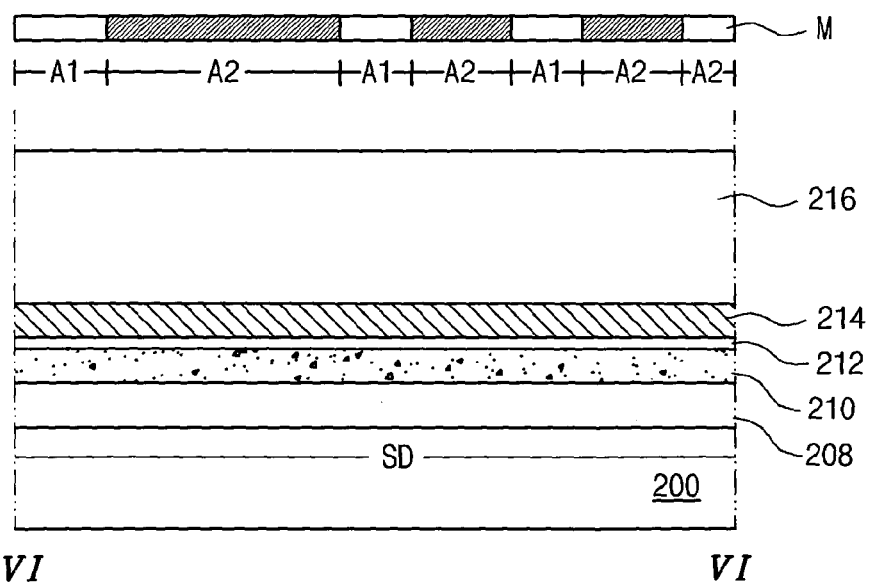
Figure 8A:
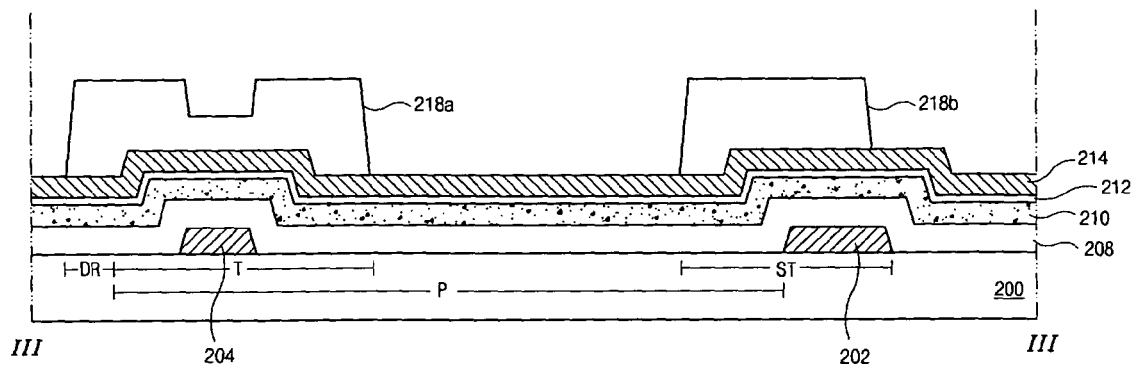
Figure 8B:
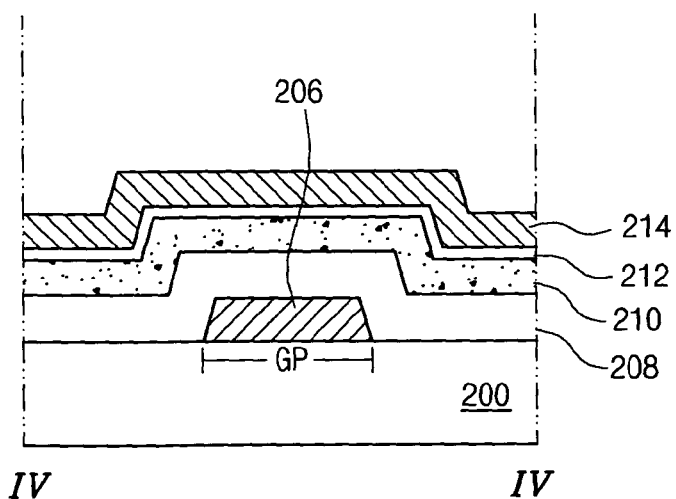
Figure 8C:
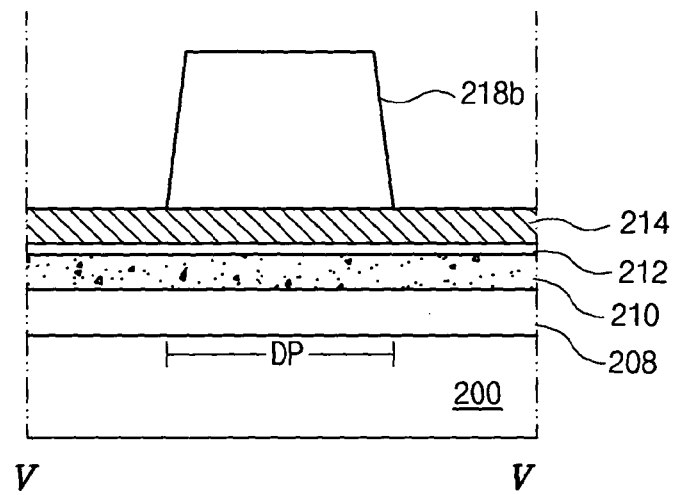
Figure 8D:
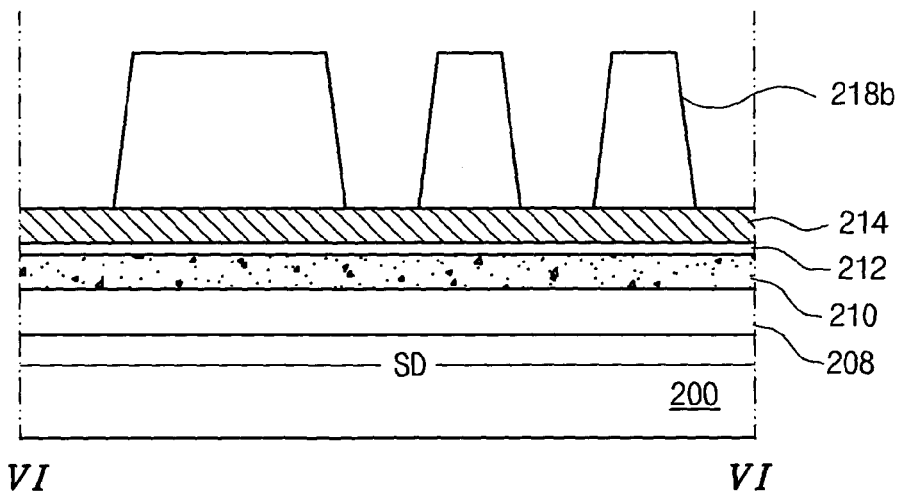
Figure 9A:
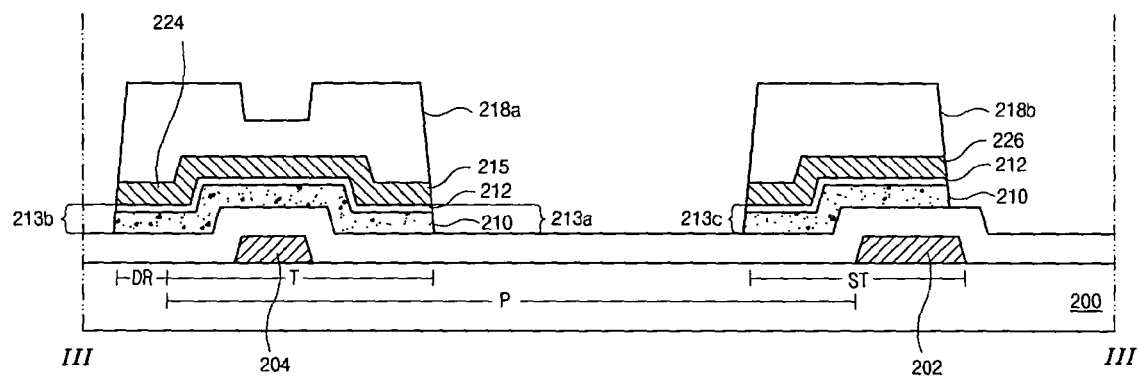
Figure 9B:
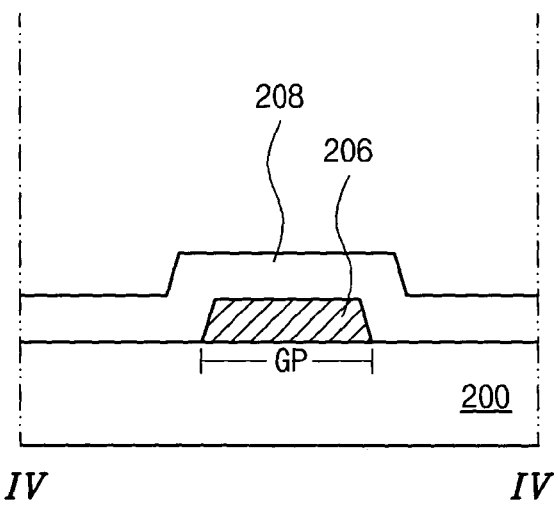
Figure 9C:
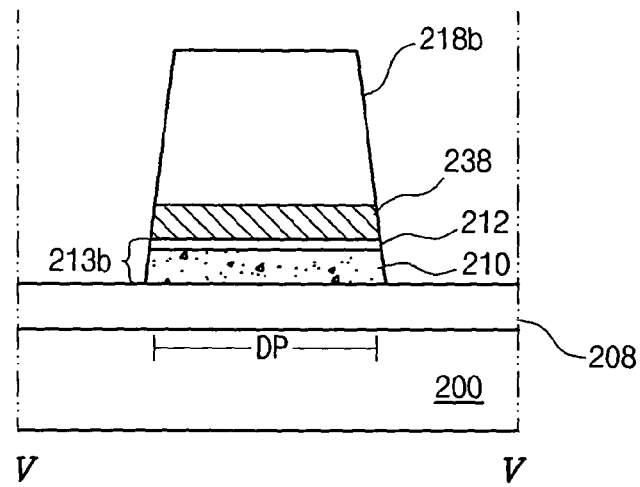
Figure 9D:
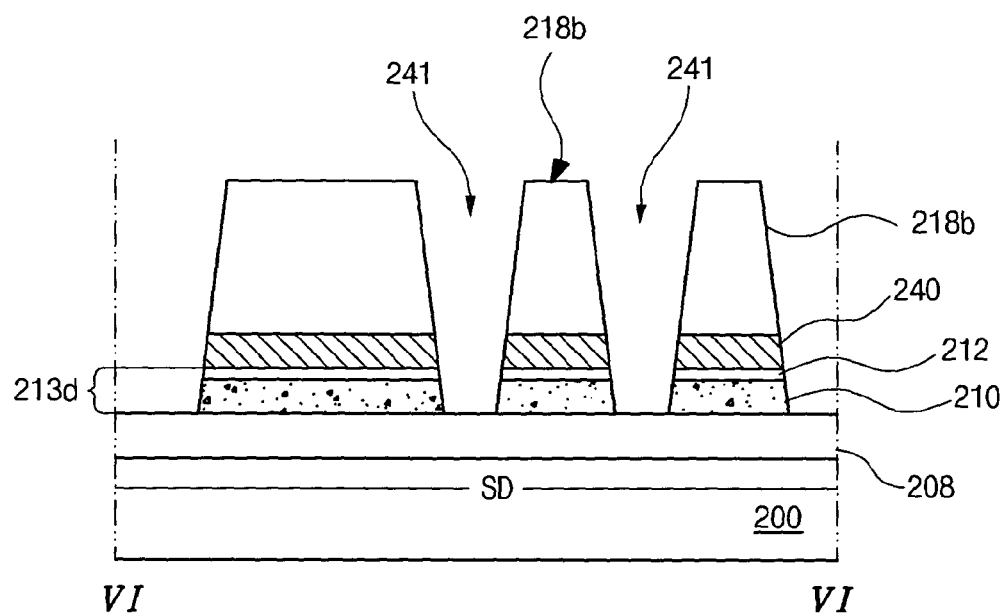
Figure 10A:
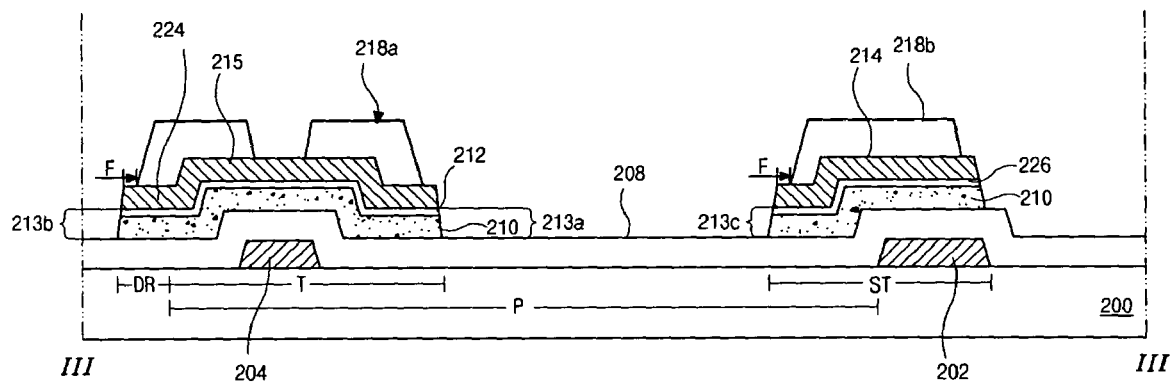
Figure 10B:
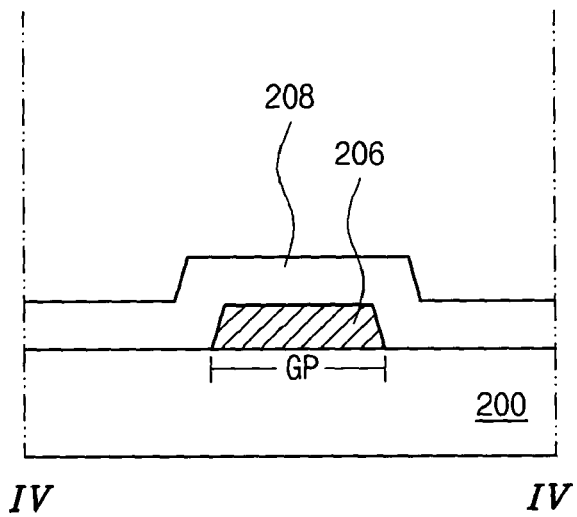
Figure 10C:
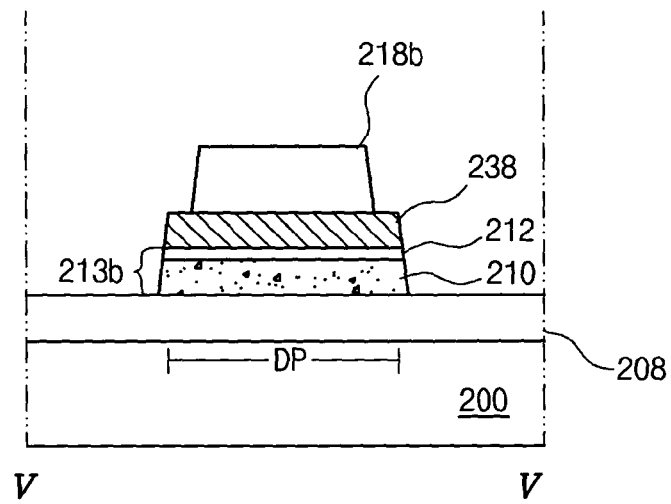
Figure 10D:
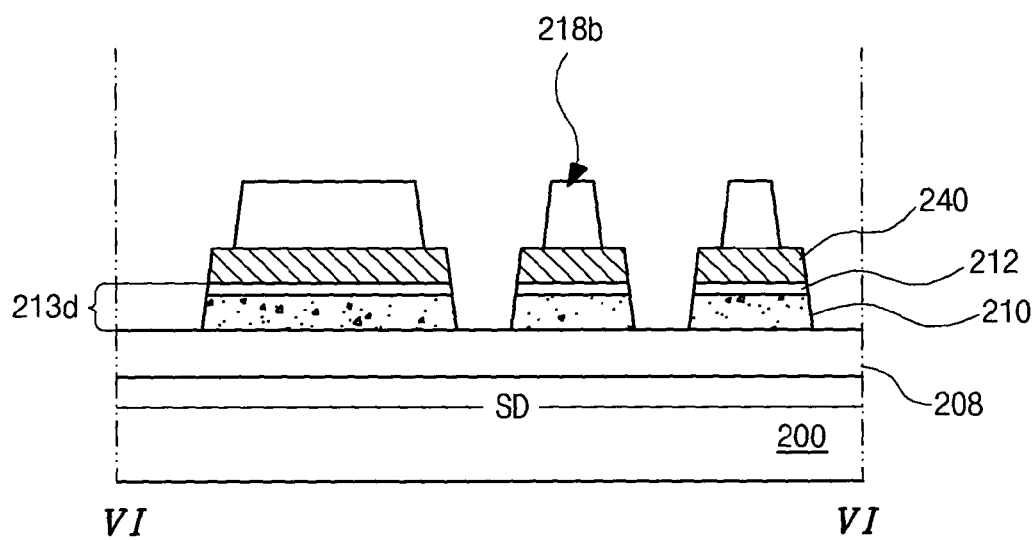
Figure 11A:
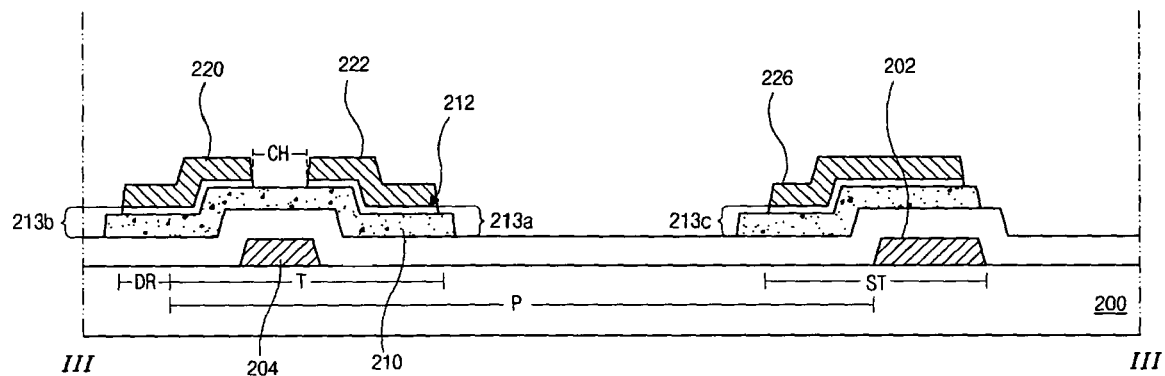
Figure 11B:
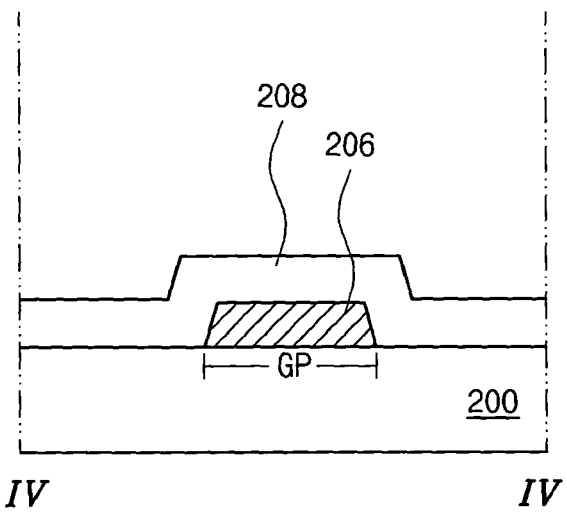
Figure 11C:
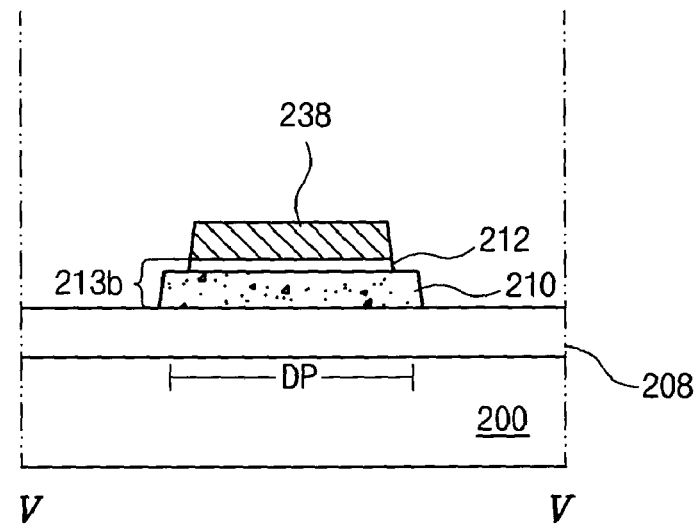
Figure 11D:
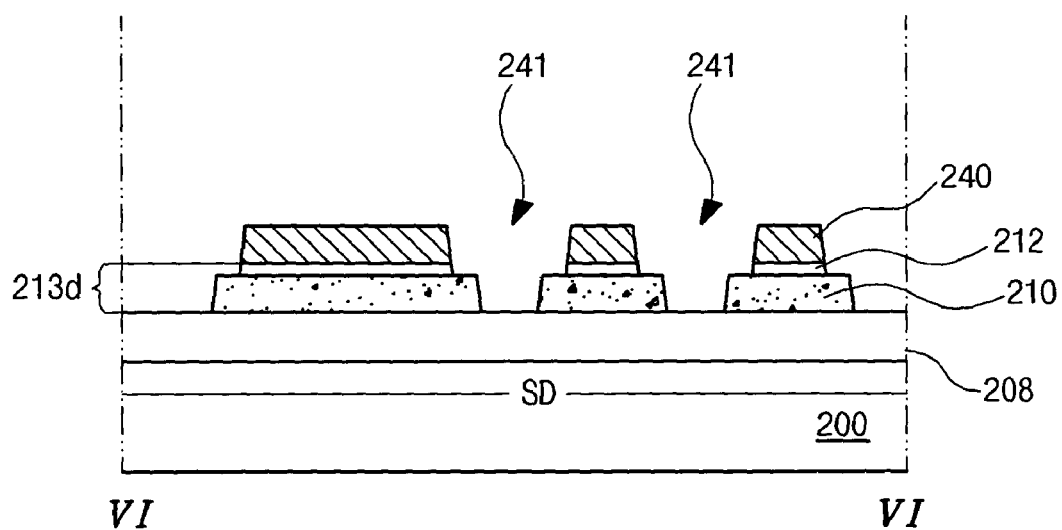
Figure 12A:
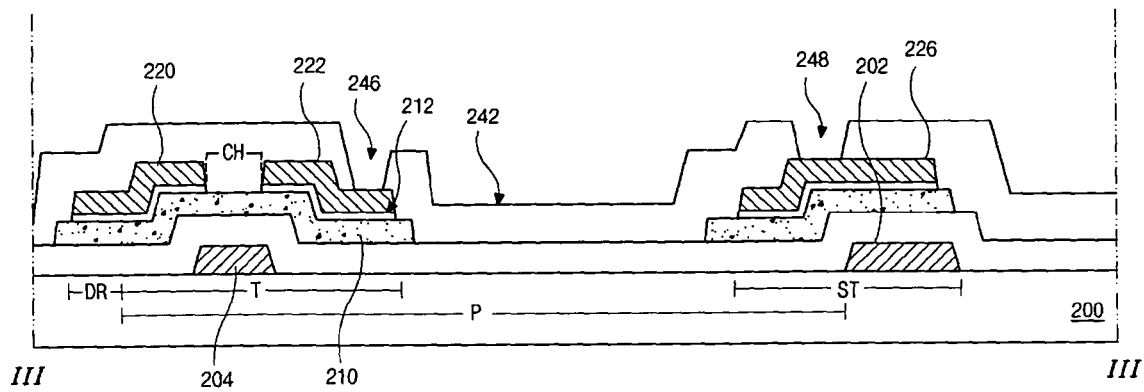
Figure 12B:
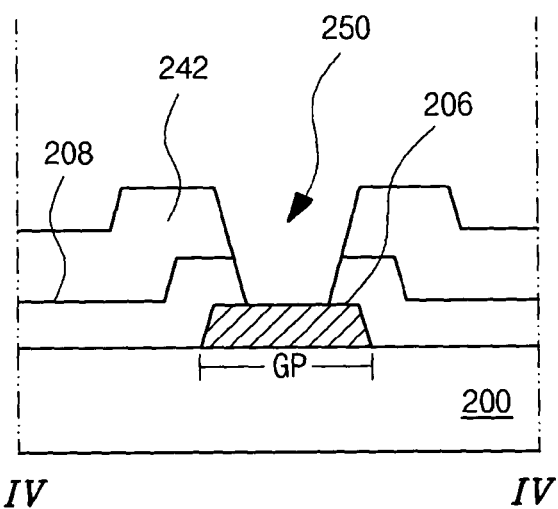
Figure 12C:
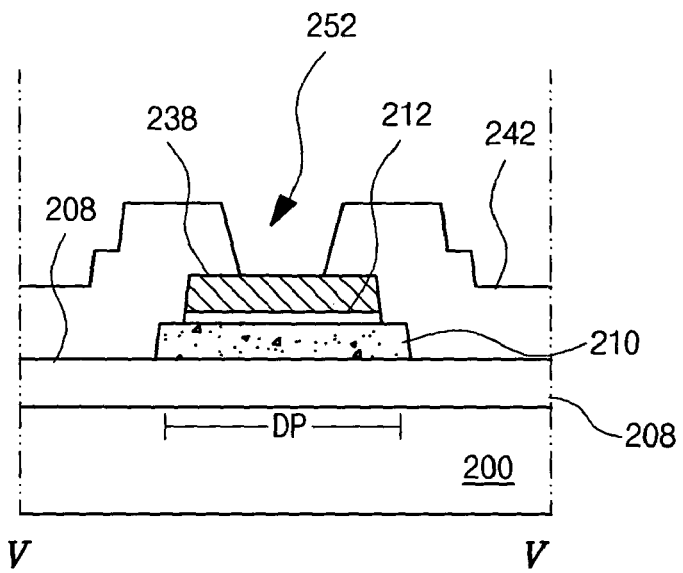
Figure 12D:
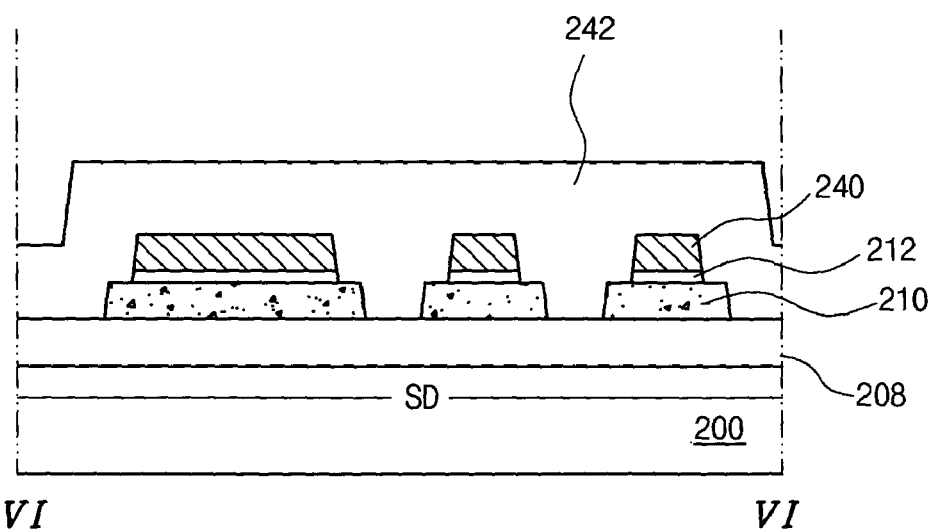
Figure 13A:
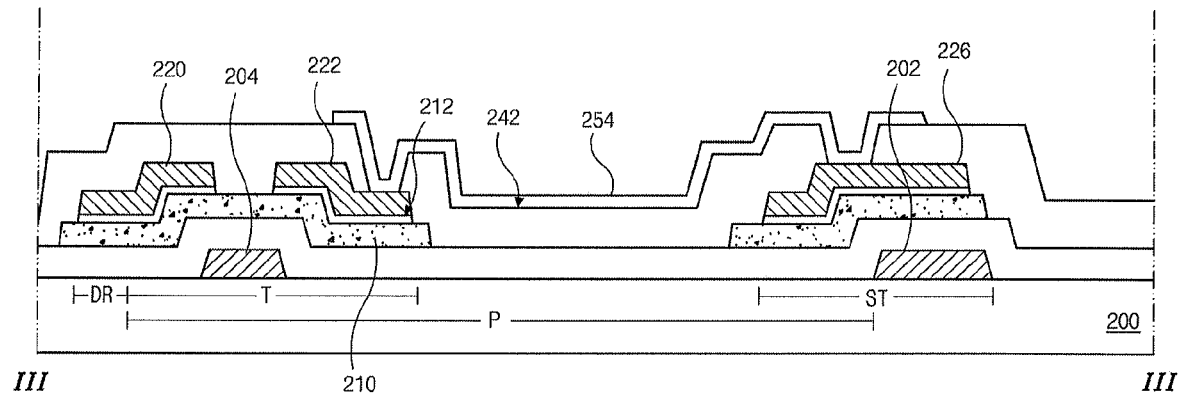
Figure 13B:
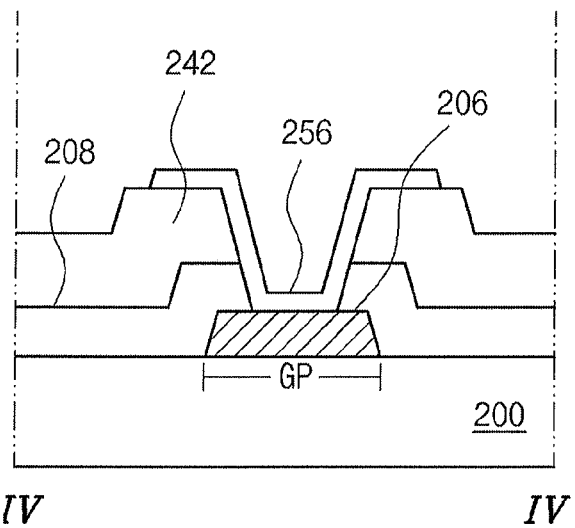
Figure 13C:
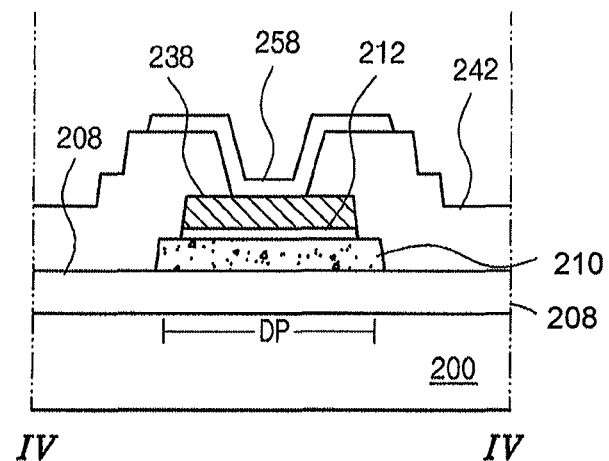
Figure 13D:
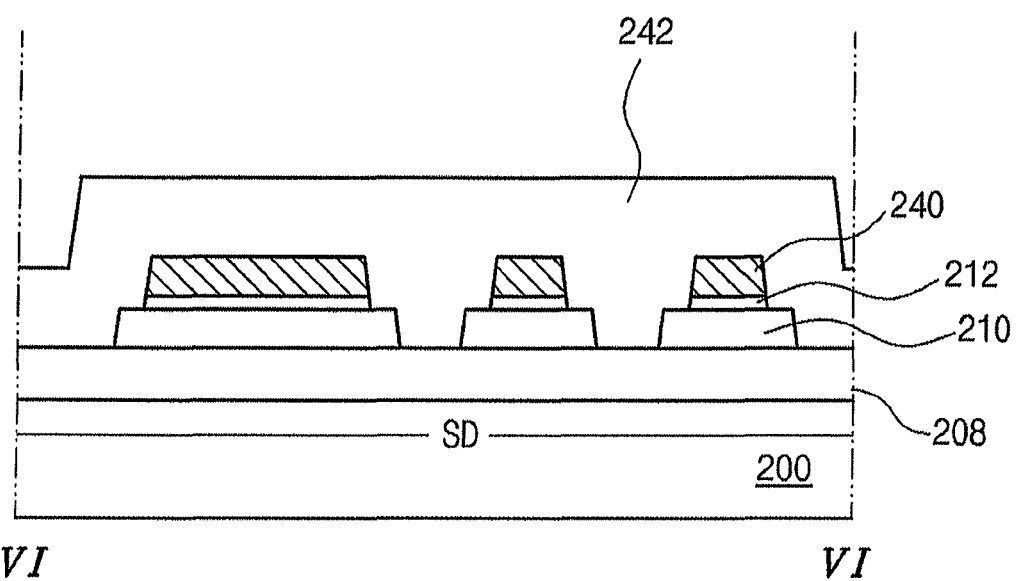

FIGS. 5A to 5C are schematic views of openings for a peripheral line having rectangular, circular and triangular shapes, respectively, according to the present invention.

As shown in FIG. 5A, an opening 241 of a peripheral line 240 may have a rectangular shape. The rectangular-shaped openings 241 may be arranged uniformly in the peripheral line 240. Further, as shown in FIG. 5B, an opening 241 of a peripheral line 240 may have a circular shape. The circular-shaped openings 241 may be arranged uniformly in the peripheral line 240. Further, as shown in FIG. 5C, an opening 241 of a peripheral line 240 may have a triangular shape. The triangular-shaped openings 241 may be arranged uniformly in the peripheral line 240.

As above explained, the opening 241 of the peripheral line 240 has slit, rectangular, circular and triangular shapes. However, it should be understood that the opening 241 may have other shapes to reduce the area of the peripheral line 240.

FIGS. 6A, 7A, 8A, 9A, 10A, 11A, 12A and 13A are cross sectional views taken along a line III-III of FIG. 3 of a fabricating method of a substrate for an LCD device according to the present invention. FIGS. 6B, 7B, 8B, 9B, 10B, 11B, 12B and 13B are cross sectional views taken along a line IV-IV of FIG. 3 of a fabricating method of a substrate for an LCD device according to the present invention. FIGS. 6C, 7C, 8C, 9C, 10C, 11C, 12C and 13C are cross sectional views taken along a line V-V of FIG. 3 of a fabricating method according of a substrate for an LCD device to the present invention. FIGS. 6D, 7D, 8D, 9D, 10D, 11D, 12D and 13D are cross sectional views taken along a line VI-VI of FIG. 3 of a fabricating method of a substrate for an LCD device according to the present invention.

As shown in FIGS. 6A to 6D, a first metal layer is deposited on a substrate 200 having a pixel region P, a switching region T, a data region DR, a storage region ST, gate and data pad regions GP and DP, and a peripheral region SD. The pixel region P, the switching region S and the storage region ST are defined in the display region D (in FIG. 4), while the gate and data pad regions GP and DP, and the peripheral region SD are defined in the non-display region ND (in FIG. 4). The first metal layer is patterned with a first mask process to form a gate line 202, a gate electrode 204 and a gate pad electrode 206. The gate pad electrode 206 is formed in the gate pad region GP. The first metal may be at least one of aluminum (Al), aluminum alloy (AlNd), copper (Cu), tungsten (W), chromium (Cr) and molybdenum (Mo).

Subsequently, a gate insulator 208 is formed entirely on the substrate 200 having the gate line 202. The gate insulator 208 may be made of an inorganic insulating material including silicon nitride (SiNx) and silicon oxide (SiO$_2$).

Subsequently, an intrinsic amorphous silicon (a-Si:H) layer 210 and an impurity-doped amorphous silicon (n+a-Si:H) layer 212 are sequentially deposited on the gate insulator 208. A second metal layer 214 is deposited on the impurity-doped amorphous silicon layer 212. The second metal layer 214 may be at least one of aluminum (Al), aluminum alloy (AlNd), copper (Cu), tungsten (W), titanium (Ti), chromium (Cr) and molybdenum (Mo).

Subsequently, as shown in FIGS. 7A to 7D, a photoresist layer 216 is deposited on the second metal layer 214 to conduct a second mask process. A second mask M is disposed over the photoresist 216. The second mask M includes a transmission portion A1, a shielding portion A2 and a semi-transmission portion A3. Through the second mask M, the photoresist 216 is exposed to a light. When the photoresist layer 216 uses a positive type resist which exposed to the light is developed, the semi-transmission portion A3 corresponds to the gate electrode 204, the shielding portion A2 corresponds to the storage region ST, the data region DR and the data pad region DP. Further, the transmission and shielding portions A1 and A2 are arranged alternately in the peripheral region SD to form a slit-shaped opening. Other-shape openings, as shown in FIGS. 5A to 5C, may be formed in a way similar to forming the slit-shaped opening according to changing suitably the transmission and shielding portions A1 and A2 corresponding to the peripheral region SD.

A light-exposure process is conducted with the second mask M, and then a developing process is conducted. Accordingly, the photoresist layer 216 is developed, and thus first and second photoresist patterns 218a and 218b are formed on the second metal layer 214, as shown in FIGS. 8A to 8D. The first photoresist pattern 218a is formed corresponding to the switching region T, and the second photoresist pattern 218b is formed corresponding to the storage region ST, the data pad region DP and the peripheral region SD. In particular, portions of the first photoresist pattern 218a corresponding to the semi-transmission portion A3 (in FIG. 7A) has a height smaller than other portions of the second photoresist pattern 218b corresponding to the shielding portion A2 (in FIG. 7A), due to the light transmittance difference. The second photoresist pattern 218b corresponding to the peripheral region SD has a plurality of holes apart form each other exposing the second metal layer 214.

Subsequently, through the first and second photoresist patterns 218a and 218b, a first etching process for the second metal layer 214, the impurity-doped amorphous silicon layer 212 and the intrinsic amorphous silicon layer 210 is conducted. The first etching process may use a dry-etching method for the three layers, or both a wet-etching method for the second metal layer 214 and a dry-etching method for the impurity-doped amorphous silicon layer 212 and the intrinsic amorphous silicon layer 210.

Through the first etching process, as shown in FIGS. 9A to 9D, source-drain electrode pattern 215 in the switching region T, a data line 224 in the data region DR, a data pad electrode 238 in the data pad region DP, a storage electrode 226 in the storage region ST, and a peripheral line 240 having an opening 241 in the peripheral region SD are formed. The opening 241 exposes the gate insulator 208. Further, first, second, third and fourth semiconductor patterns 213a, 213b, 213c and 213d having the same shape in plane as the source-drain electrode pattern 215, the data line 224 and the data pad electrode 238, the storage electrode 226 and the peripheral line 240, respectively, are formed. Each of the first, second, third and fourth semiconductor patterns 213a, 213b, 213c and 213d includes the patterned impurity-doped silicon layer 222 and the patterned intrinsic amorphous silicon layer 210. In particular, the patterned intrinsic amorphous silicon layer 210 and the patterned impurity-doped amorphous silicon layer 212 of the first pattern semiconductor pattern 213a are referred to as an active layer and an ohmic contact layer, respectively.

Subsequently, as shown in FIGS. 10A to 10D, an ashing process for the first and second photoresist patterns 218a and 218b is conducted. The ashing process is conducted until portions of the first photoresist pattern 218a corresponding to the semi-transmission portion A3 (in FIG. 7A) are removed to expose the source-drain electrode pattern 215. When the ashing process conducted, upper portions and side portions of the first and second photoresist patterns 218a and 218b are partially removed. Accordingly, heights of the first and second photoresist patterns 218a and 218b are reduced, and side portions F of the source-drain electrode pattern 215, the data line 224 and the data pad electrode 238, the storage electrode 226 and the peripheral line 240 are exposed through the ashed photoresist patterns 218a and 218b.

Subsequently, a second etching process is conducted with the ashed photoresist patterns 218a and 218b, and thus the exposed portions of the source-drain electrode pattern 215 and the side portions F of the source-drain electrode pattern 215, the data line 224 and the data pad electrode 238, the storage electrode 226 and the peripheral line 240 are removed. Accordingly, as shown in FIGS. 11A to 11D, source and drain electrodes 220 and 222 apart from each other in the switching region T. Then, the ashed photoresist patterns 218a and 218b (in FIGS. 10A to 10D) are stripped.

Subsequently, the patterned impurity-doped silicon layer 212 of the first semiconductor pattern 213a is etched with the source and drain electrodes 220 and 222 as an etching mask to form a channel CH corresponding to the gate electrode 204.

Further, side portions of the patterned impurity-doped amorphous silicon layer 212 of the first to fourth semiconductor patterns 213a to 213d are removed with the source and drain electrodes 220 and 222, the data line 224, the data pad electrode 238, the storage electrode 226 and the peripheral line 240 as an etching mask.

The semiconductor patterns 213a to 213d have widths greater than the source and drain electrodes 220 and 222, the data line 224, the data pad electrode 238, the storage electrode 226, and the peripheral line 240, due to the second etching process.

Subsequently, as shown in FIGS. 12A to 12D, a passivation layer 242 is formed entirely on the substrate 200 having the data line 224. The passivation layer 242 may be formed of an inorganic insulating material including silicon nitride (SiNx) and silicon oxide ($SiO_2$), or an organic insulating material including benzo-cyclo-butene (BCB) and acrylic. With a third mask process, first, second, third and fourth contact holes 246, 248, 250 and 252 are formed. The first, second and fourth contact holes 246, 248 and 252 are formed with etching the passivation layer 242, and thus the first, second and fourth contact holes 246, 248 and 252 expose the drain electrode 222, the storage electrode 226 and the data pad electrode 238. The third contact hole 250 is formed with etching the passivation layer 242 and the gate insulator 208, and thus the third contact hole 250 exposes the gate pad electrode 206.

Subsequently, as shown in FIGS. 13A to 13D, a transparent conductive material is deposited on the passivation layer 242, and is patterned with a fourth mask process to form a pixel electrode 254, a gate pad electrode terminal 256 and a data pad electrode terminal 258. The pixel electrode 254 contacts the drain electrode 222 and the storage electrode 226 through the first and second contact holes 246 and 248 (in FIG. 12A), respectively. The gate pad electrode terminal 256 contacts the gate pad electrode 206 through the third contact hole 250 (in FIG. 12B). The data pad electrode terminal 258 contacts the data pad electrode 238 through the fourth contact hole 252 (in FIG. 12C). The transparent conductive material may include indium-tin-oxide (ITO) and indium-zinc-oxide (IZO).

Through the above explained processes, the substrate for the LCD device of the present invention is fabricated. In the substrate for the LCD, the peripheral line having a large area to reduce the resistance thereof has openings to reduce the area of the peripheral line. Accordingly, the concentration of plasma generated for the dry-etching method on the peripheral line can be reduced, and thus over-etching thereof can be reduced. Therefore, the resistance of the peripheral line can be uniform, and thus display quality of the LCD device can be improved.

It will be apparent to those skilled in the art that various modifications and variations can be made in the substrate for the LCD device and the method of fabricating the substrate for the LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a substrate having a display region and a non-display region;
    a gate line and a data line to define a pixel region in the display region;
    a thin film transistor at a crossing of the gate and data lines, the thin film transistor including a gate electrode and source and drain electrodes;
    a gate pad electrode at one end of the gate line, and a data pad electrode and a first semiconductor layer at one end of the data line, the data pad electrode on the first semiconductor layer;
    a peripheral line defining a plurality of openings in the non-display region and spaced apart from the data line;
    a second semiconductor layer extended along and below the peripheral line, the second semiconductor layer in direct contact with the peripheral line;
    a pixel electrode connected to the drain electrode in the pixel region; and
    a passivation layer that fills the plurality of openings defined by the peripheral line and that contacts the second semiconductor layer,
    wherein the peripheral line completely overlaps the second semiconductor layer.

2. The device according to claim 1, wherein the openings have at least one of slit, rectangular, circular or triangular shapes.

3. The device according to claim 1, wherein the peripheral line includes a common line or a ground line.

4. The device according to claim 1, further comprising a third semiconductor layer on the gate electrode.

5. The device according to claim 1, wherein the second semiconductor layer has the plurality of openings along with the peripheral line.

6. The device according to claim 1, wherein the first semiconductor layer is extended along and below the data line.

7. The device according to claim 1, further comprising a storage electrode and a fourth semiconductor layer overlapping the gate line, the storage electrode on the semiconductor layer.

8. The device according to claim 1, further comprising a gate pad electrode terminal on the gate pad electrode, and a data pad electrode terminal on the data pad electrode.

9. The device according to claim 1, further comprising a gate insulator on the gate electrode, the gate insulator exposed through the openings.

10. The device according to claim 4, wherein a width of the third semiconductor layer is larger than the source and drain electrodes.

11. The device according to claim 1, wherein a width of the second semiconductor layer is larger than the peripheral line.

12. The device according to claim 6, wherein a width of the first semiconductor layer is larger than the data line.

13. The device according to claim 4, wherein the third semiconductor layer has the same shape as the source and drain electrodes.

14. The device according to claim 1, wherein the second semiconductor layer has the same shape as the peripheral line.

15. The device according to claim 6, wherein the first semiconductor layer has the same shape as the data line.

16. The device according to claim 4, wherein the third semiconductor layer includes at least one of an intrinsic amorphous silicon layer or an impurity-doped amorphous silicon layer.

17. The device according to claim 1, wherein the second semiconductor layer includes at least one of an intrinsic amorphous silicon layer or an impurity-doped amorphous silicon layer.

18. The device according to claim 6, wherein the first semiconductor layer includes at least one of an intrinsic amorphous silicon layer or an impurity-doped amorphous silicon layer.

19. The device according to claim 1, further comprising a passivation layer between the drain electrode and the pixel electrode, the passivation layer having a contact hole contacting the drain electrode and the pixel electrode.

* * * * *